United States Patent [19]

Magara et al.

[11] Patent Number: 5,006,692
[45] Date of Patent: Apr. 9, 1991

[54] WIRE ELECTRODE SUPPLYING DEVICE FOR USE IN A WIRE CUT ELECTRIC DISCHARGE MACHINING APPARATUS

[75] Inventors: Takuji Magara; Takeshi Iwasaki; Toshio Suzuki; Masahiro Yamamoto, all of Aichi, Japan

[73] Assignee: Mitsubishi Denki K.K., Tokyo, Japan

[21] Appl. No.: 353,421

[22] Filed: May 18, 1989

[51] Int. Cl.⁵ .............................................. B23H 7/10
[52] U.S. Cl. ................................................ 219/69.12
[58] Field of Search ................... 219/69.12; 140/139, 140/140; 226/91, 196, 199

[56] References Cited

U.S. PATENT DOCUMENTS

| | | | |
|---|---|---|---|
| 4,598,189 | 7/1986 | Inoue et al. | 219/69.12 |
| 4,608,478 | 8/1986 | Aso et al. | 219/69.12 |
| 4,652,716 | 3/1987 | Schneider et al. | 219/69.12 |

FOREIGN PATENT DOCUMENTS

| | | | |
|---|---|---|---|
| 56-89436 | 7/1981 | Japan . | |
| 58-56732 | 4/1983 | Japan . | |
| 192721 | 11/1983 | Japan | 219/69.12 |
| 60-52224 | 3/1985 | Japan . | |
| 62-11970 | 3/1987 | Japan . | |
| 130129 | 6/1987 | Japan | 219/69.12 |

*Primary Examiner*—Geoffrey S. Evans
*Attorney, Agent, or Firm*—Sughrue, Mion, Zinn, Macpeak & Seas

[57] ABSTRACT

A wire electrode supplying device in a wire cut electric discharge machining apparatus, which is capable of automatically supplying a wire electrode with accuracy during an automatic machining operation. In the wire electrode supplying device according to the present invention, an outside diameter of a pipe guide into which the wire electrode is inserted is changed stepwise, and its one end portion is made minimum in outside diameter so that the one end portion is allowed to be inserted into a machining start hole formed in a workpiece to be machined. Therefore, in machining a workpiece having a machining start hole small in diameter, the feeding of the wire electrode can be automatically, stably and accurately achieved.

3 Claims, 6 Drawing Sheets

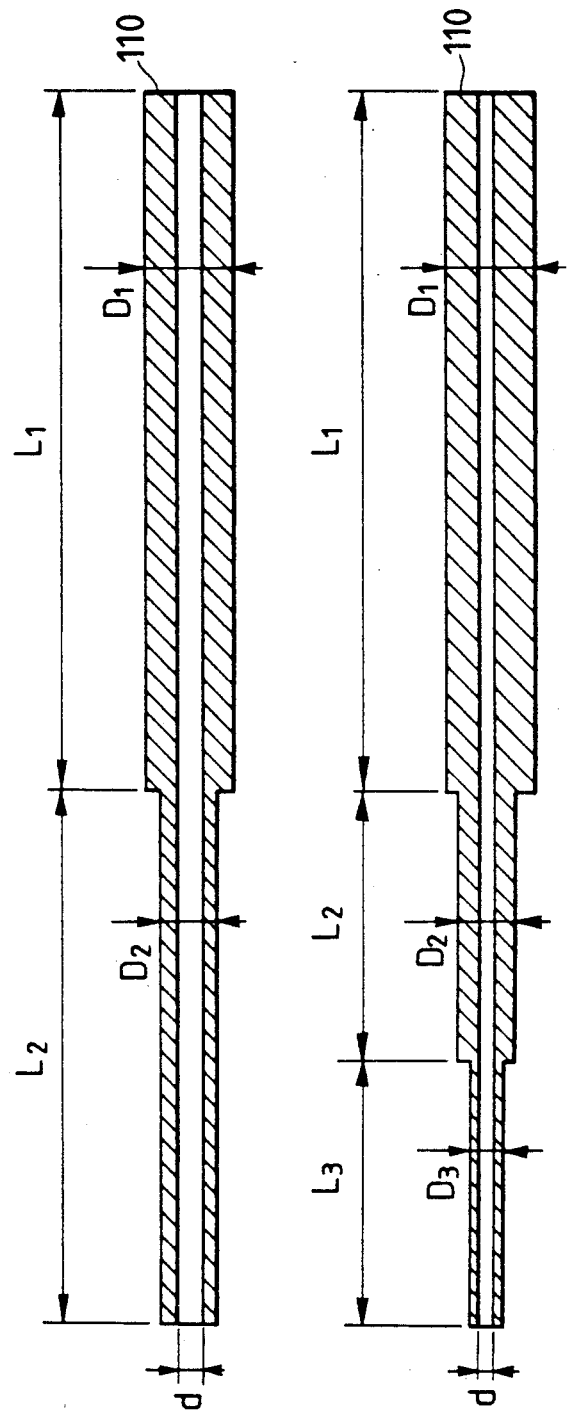

WIRE ELECTRODE SUPPLYING DEVICE FOR USE IN A WIRE CUT ELECTRIC DISCHARGE MACHINING APPARATUS

BACKGROUND OF THE INVENTION

The present invention relates to a wire electrode supplying device for use in a wire cut electric discharge machining apparatus.

FIG. 1 is a perspective view showing a wire electrode supplying device in a conventional wire cut electric discharge machining apparatus, which has been disclosed, for instance, in Japanese Patent Application (OPI) No. 80428/1985 (the term "OPI" as used herein means an "unexamined published application").

In FIG. 1, reference numeral 10 designates a workpiece to be machinined on an X-Y cross table (not shown) movable in a horizontal plane; 12a and 12b, cutting start holes formed in the workpiece 10; 14, a guide supporting the wire electrode supplying device, the guide 14 being secured to a shaft which is movable along the Z-axis of the body (not shown) of the wire cut electric discharge machine; i.e., in a vertical direction; and 16, a slider in a moving mechanism 17, the slider 16 being movable up and down along the guide 14. The slider 16 is threadably engaged with a drive screw 18, and the upper end portion of the drive screw 18 is coupled to a drive motor 20 which is secured to the upper end portion of the guide 14, so that the slider 16 is slid on the guide by means of the drive screw 18 and the drive motor 20. A roller mechanism 22 is provided on the slider 16. The roller mechanism 22 comprises a wire electrode feeding pulley 24 and a clamp pulley 26. The rotary shaft of the wire electrode feeding pulley 24 is coupled to a wire electrode feeding motor 28 which is secured to the slider 16. The wire electrode feeding pulley 24 is provided with a reverse rotation preventing mechanism (backstop) 29. The clamp pulley 26 is rotatably supported on the front end portion of a link 32 which is swingably mounted through a pin 30 on the slider 16. The rear end portion of the link 32 is connected through a coil spring 34 to the slider 16. Thus, the clamp pulley 26 at the end of the link 32 is held pushed against the cylindrical wall of the wire electrode feeding pulley by the elastic force of the coil spring 34.

Further in FIG. 2, reference numeral 36 designates a pipe guide (about 2 to 3 mm in outside diameter for instance) into which a wire electrode 38 is inserted so as to be held there. The upper end of the pipe guide 36 is secured through a mounting part 40 to the slider 16 forming the moving mechanism 17. A power source guide for slidably supporting the wire electrode 38 is fitted in the lower end portion of the pipe guide 36. A predetermined voltage 90 is applied across the pipe guide 36 and the workpiece 10. When the pipe guide 36 and the workpiece 10 are brought into contact with each other, a detector 91 outputs a detection signal. In response to the signal thus outputted, the drive motor 20 is stopped, while the wire electrode feeding motor 28 is started, so that the wire electrode 38 is fed together with the pipe guide 36. A clamp mechanism 42 for fixedly holding the pipe guide 14 at a predetermined position is provided at the lower end portion of the guide 14. The clamp mechanism 42 comprises: a clamp board 44a having a V-groove secured to the guide 14 and a clamp board 44b connected to a solenoid 46 secured to the guide 14. When the solenoid 46 is energized, the clamp board 44b is moved away from the clamp board 44a, so that the clamp mechanism is released. When, on the other hand, the solenoid 46 is deenergized, the clamp board 44b is moved towards the clamp board 44a by the elastic force of a coil spring 48 held between the solenoid 46 and the clamp board 44b, so that the clamp mechanism 42 is placed in clamping state.

Further in FIG. 1, reference numeral 50 designates a cutting mechanism for cutting the wire electrode 38 at a predetermined point, and removing the discard of the wire electrode; and 52, an arm which is the body of the cutting mechanism. The arm 52 is fixedly secured to the rotary shaft of a drive motor 54 secured to one side wall of the guide 14 so that it is turned in a horizontal plane. A rod 56 is provided inside the arm 52 in such a manner as to be slidable along the latter 52. A solenoid 58 is secured to the arm 52, and a link 62 is swingably mounted on a pin 60 secured to the arm 52, so that, upon energization of the solenoid 58, the rod is moved towards the front end of the arm with the aid of the link 62. A coil spring 64 is held between the rear end of the rod 56 and one side wall of the arm 52, so that, upon deenergization of the solenoid 58, the rod 56 is returned; i.e., slid towards the rear end of the arm 52. An edge 66 and a clamp pin 68 are fixedly secured to the front end face of the rod 56 so that the wire electrode 38 which is inserted between the front end face of the rod 56 and the inner side wall of the arm 52 is held with the clamp pin 68 and cut with the edge 66. A coil spring 70 is held between the clamp pin 68 and the front end face of the rod 56 to apply a predetermined elastic force to the clamp pin 68.

Further in FIG. 1, reference numeral 72 designates a lower electrode guide provided at the position where it is confronted with the electrode in the pipe guide 36 through the workpiece 10. The wire electrode 38 is slidably inserted into the lower electrode guide 72 so as to be held at a predetermined position A winding mechanism 74 is provided below the lower electrode guide 72. The winding mechanism 74 operates to wind the front end portion of the wire electrode 38 which is so fed as to pass through the workpiece 10, and to wind the discard of the wire electrode 38 broken to thereby remove it. An electric feeder 100 is provided between the inlet of the winding mechanism 74 and the lower electrode guide 74, to supply current to the wire electrode 38. A part of the winding mechanism 74 is made up of three rollers 76a, 76b and 76c. An endless belt 76d is laid over the rollers 76a and 76c, and the cylindrical walls of the three rollers are pushed against one another through the endless belt 76d. The rotary shaft of the roller 76b is coupled through rollers 76a and 79b and an endless belt 79c to a winding motor 78 and to a winding roller 79d. A roller 79e is provided for the winding roller 79d in such a manner as to be pushed against the latter 79d. A guide pipe 79f is provided between the winding sections. A voltage 93 is applied across the roller 79e and the wire electrode 38 in the pipe guide 36, and a detector 92 provides an output signal. A tension mechanism 80 is provided above the guide 14, to prevent the slackening of the wire electrode 38 and to tension the latter 38 as required for machining. The tension mechanism 80 is made up of a bobbin 82 on which the wire electrode 38 is wound, and a torque motor 84 which rotates in the direction opposite to the direction of feed of the wire electrode to prevent the wire electrode 38 from coming off the bobbin. That is, the torque motor 84 applies a certain resiliency to the bobbin 82 in the direction opposite to the direction of feed of the wire electrode 38.

FIG. 2 is an enlarged sectional view showing essential components of the above-described wire electrode supplying device in the case where the wire electrode together with the pipe guide is supplied in such a manner as to pass through the workpiece. FIG. 3 is also an enlarged sectional view in the case where the wire electrode is fed with the pipe guide in contact with the workpiece. In FIGS. 2 and 3, those components which have been previously described with reference to FIG. 1 are therefore designated by the same reference numerals or characters.

In FIGS. 2 and 3, reference numeral 94 designates an electrode guide fitted into the front end portion of the pipe guide 36. The electrode guide 94 is such that a die-shaped guide 95 made of diamond is fitted in the pipe guide 36 through a sintered metal member 96. In the above-described electrode guide 72 provided below the workpiece 10, a die-shaped guide 97 of diamond is fixedly supported by a sintered metal member 98, and the inlet of a wire introducing section 99 substantially in the form of a cone extended to the die-shaped guide 97 has a diameter larger than the outside diameter of the pipe guide 36. The center of the lower electrode guide 72, and the inlet of the winding mechanism; that is; the nipping region of the roller 76b and the endless belt 76d are substantially on one line. The electric feeder 100 is so positioned that the inner wall 100a which is brought into contact with the wire electrode 38 is shifted (about 0.5 to 3 mm for instance) from the above-described one line. The electric feeder 100 has a wire introducing section 100b substantially in the form of a cone which has a diameter larger than the diameter of the outlet of the lower electrode guide 72.

In automatically supplying the wire electrode 38 to the cutting start holes 12a and 12b in the workpiece 10, the wire electrode supplying device is operated as follows: First, the pipe guide 36 is moved relative to the workpiece 10 so as to be coaxial with the cutting start hole 12a for instance. Under this condition, the solenoid 46 is energized to release the clamp mechanism 42 to thereby release the pipe guide 36. Then, the drive motor 20 is operated to move the slider 16 to the upper portion of the guide 14 to thereby move the pipe guide 36 to the top of the guide. Thereafter, the roller mechanism 22 of the slide 16 is operated to feed the wire electrode 38 until the wire electrode 38 is extended by a suitable length, from the lower end of the pipe guide 36. Next, the drive motor of the cutting mechanism 50 is operated to swing the arm 52 180° towards the wire electrode 38, and then the solenoid 58 is energized to cause the edge 66 at the front end of the rod 56 to cut the wire electrode 38 leaving a certain length (3 to 10 mm for instance) from the lower end of the pipe guide 36. With the discard of the wire electrode clamped with the clamp pin 68 provided at the front end of the rod 56, the drive motor 54 is operated to return the arm 52 to the original position. Under this condition, the clamp in 68 is released, to remove the discard of the wire electrode 38. Thereafter, the drive motor 20 located above the guide 14 is operated to move the slider 16 down on the guide 14, so that, when the diameter of the cutting start hole 12a is larger than the outside diameter of the pipe guide 36, the pipe guide 36 is moved downwardly to pass through the cutting start hole 12a until it is positioned slightly before the electrode guide 72 below the workpiece 10. In the case where the diameter of the cutting start hole 12a is smaller than the outside diameter of the pipe guide 36, the pipe guide 36 is moved downwardly until it is brought into contact with the upper surface of the workpiece 10 and the detector 91 is operated. After the abovedescribed operations, the state of the wire electrode supplying device is as shown in FIGS. 2 and 3.

Under this condition, the roller mechanism 22 on the slider 16 is operated to move the wire electrode 38 along the pipe guide 36, so that the front end portion of the wire electrode 38 passes through the electrode guide 94 and the lower electrode guide 72 and reaches the winding mechanism 74 while being guided by the wire introducing section 100b of the electric feeder 100. As a result, it is wound on the winding mechanism 74. When the wire electrode 38 reaches the rollers 79d and 79e, the detector 92 is activated. As a result, the roller mechanism 22 is stopped, and the winding mechanism 74 is also stopped, while the drive motor 20 is operated so as to move the slider 16 up the guide 14. Therefore, in the case where the pipe guide 36 has penetrated the workpiece 10, it is removed therefrom; and in the case where it has been in contact with the workpiece, it is disconnected therefrom.

Thereafter, when the slider comes to a predetermined position, the solenoid 46 is deenergized so that the lower end portion of the pipe guide 36 is fixed to the guide 14 with the clamp mechanism 42. Thus, the wire electrode 38 is automatically supplied in such a manner that is passes through the machining start hole 12a in the workpiece 10. Accordingly current can be positively applied to the wire electrode 38.

The wire electrode supplying device of the invention will be described with respect to the case where the wire electrode is broken because of failures or troubles occurring during electro-discharge machining, and it is required to automatically supply the wire electrode again.

When the wire electrode 38 is broken, the reverse rotation preventing mechanism 29 of the roller mechanism 22 prevents the removal of the wire electrode 38 from the pipe guide 36 by the tension mechanism 80 located above the guide 14; that is, the wire electrode 38 is held clamped by the roller mechanism 22. Therefore, the wire electrode 38 between the bobbin 82 and the pipe guide 36 is held stopped, and the rotation of the rotation detector 86 is stopped, thus determining the fact that the wire electrode 38 has been broken during electro-discharge machining. Thereupon, the clamp mechanism 42 at the lower end of the guide 14 is released to thereby release the pipe guide. Under this condition, the drive motor 20 is operated to move the pipe guide 36 to the top of the guide 14, while the winding mechanism 74 is operated to remove the discard of the broken wire electrode 38 from the workpiece 10. Then, the pipe guide 36 is moved relative to the workpiece 10 so that it is in alignment with the machining start hole 12a of the workpiece. Under this condition, the wire electrode supplying device is operated according to the above-described method of supplying the wire electrode to the cutting start hole (12a), so that the wire electrode 38 is automatically supplied in such a manner that it penetrates the workpiece 10. Thereafter, according to the electro-discharge machining operation which has been done with the workpiece, the wire electrode 38 is moved to the position without electric discharge where it has been broken. And the electro-discharge machining is carried out again. The abovedescribed movement of the wire electrode 38 with respect to the workpiece 10 is automatically achieved with a CNC device (not shown) provided in the wire cut electric discharge machining apparatus.

The conventional wire electrode supplying device in a wire cut electric discharge machine is constructed as described above. Therefore, in the case where the diameter of the machining start hole 12a or 12b is smaller than the outside diameter of the pipe guide 36, in supplying the wire electrode, the pipe guide 36 is not allowed to be inserted into the machining start hole and the wire electrode 38 is guided to and inserted into the machining start hole. Therefore, depending, for instance, on the surface configuration of the machining start holes 12a and 12b and burrs on the upper and lower surfaces of the workpiece 10, it may be difficult to smoothly insert the wire electrode 38 into the holes. In this case, it may be impossible to automatically feed the wire electrode, and the unmanned operation is thus suspended.

The wire electrode 38 is liable to curl itself. Therefore, if, in inserting the wire electrode 38 into the machining start holes 12a and 12b, the diameter of the latter 12a and 12b is large, then as shown in FIG. 4 the end portion of the wire electrode may be not received by the tapered receiving surface of the electrode guide 72. Even if the end portion of the wire electrode 38 is received in the wire guide 72, it may be readily bent by a load applied thereto. In this case also, it become difficult to automatically feed the wire electrode. It has been known that, in the case where a wire electrode of brass 0.2 mm in diameter is employed, the diameter of the machining start holes must be 2 mm or less in order to perform the automatic wire electrode supplying operation with high reliability. In this case, generally the outside diameter of the pipe guide is of the order of 4 mm, and the diameter of the machining start holes is ranged from .2 to 4 mm.

In the case where the machining start holes are small in diameter as described above, the conventional automatic wire electrode supplying device cannot be used. And the smaller the diameter of the wire electrode, the severer the limitation of the hole diameter.

SUMMARY OF THE INVENTION

Accordingly, an object of this invention is to eliminate the above-described difficulties accompanying a conventional wire electrode supplying device in a wire cut electric discharge machining apparatus. More specifically, an object of the invention is to provide a wire electrode supplying device for use in a wire cut electric discharge machining apparatus which, even when the machining start holes are small in diameter, can automatically supply a wire electrode in a wide range of wire diameter.

The above and other objects of the present invention are met by the provision of a wire electrode supplying device for use in a wire cut electric discharge machining apparatus, in which the outside diameter of the pipe guide, into which the wire electrode is inserted, is changed stepwise, and its one end portion minimum in outside diameter can be inserted into the machining start hole formed in the workpiece.

With a wire electrode supplying device according to the present invention, as the lifting mechanism moves downwardly, the pipe guide is inserted into the machining start hole formed in the workpiece, and then the wire electrode is fed by the wire electrode feeding mechanism. When the end portion of the wire electrode thus fed reaches the winding mechanism through the wire electric feeder, the pipe guide is lifted by the lifting mechanism to a predetermined position.

BRIEF DESCRIPTION OF THE DRAWINGS

In the accompanying drawings:

FIG. 6A and FIG. 6B are longitudinal sectional view illustrating examples of a guide pipe in the wire electrode supplying device according to the present invention, respectively.

DESCRIPTION OF THE PREFERRED EMBODIMENTS

Figure 1:
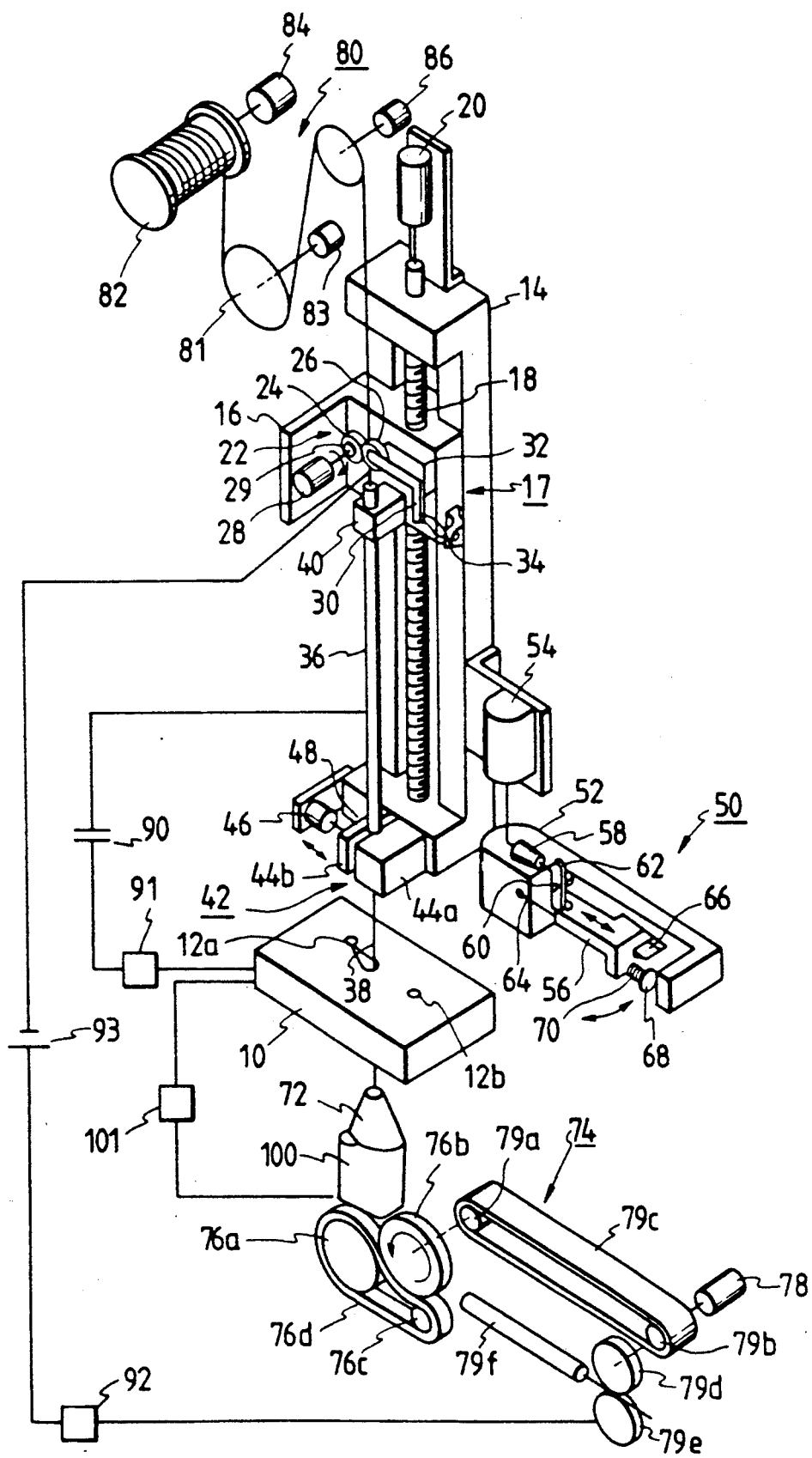
FIG. 1 is an explanatory diagram showing a conventional wire electrode supplying device for use in a wire cut electric discharge machining apparatus.
Figure 2:
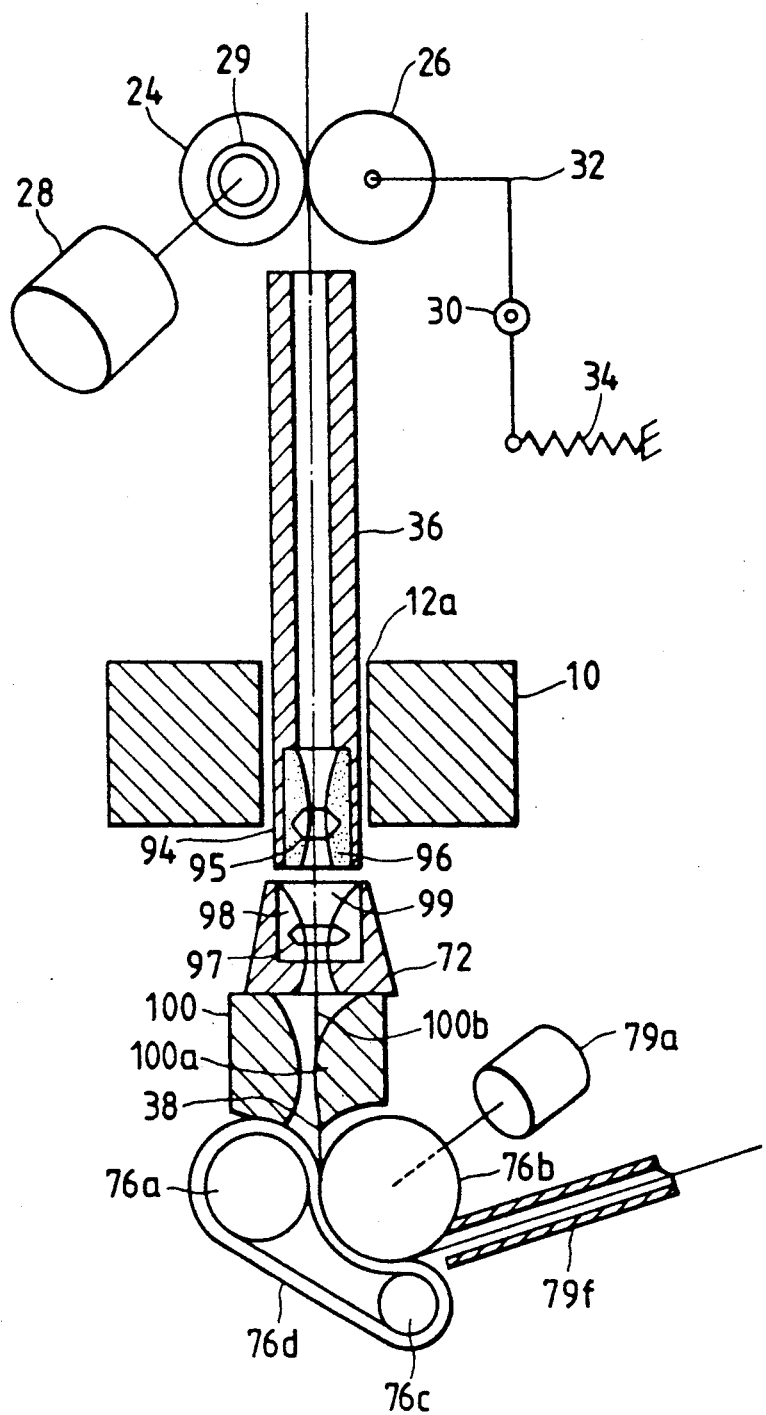
FIGS. 2 through 4 are sectional diagrams showing essential components of the conventional wire electrode supplying device.
Figure 3:
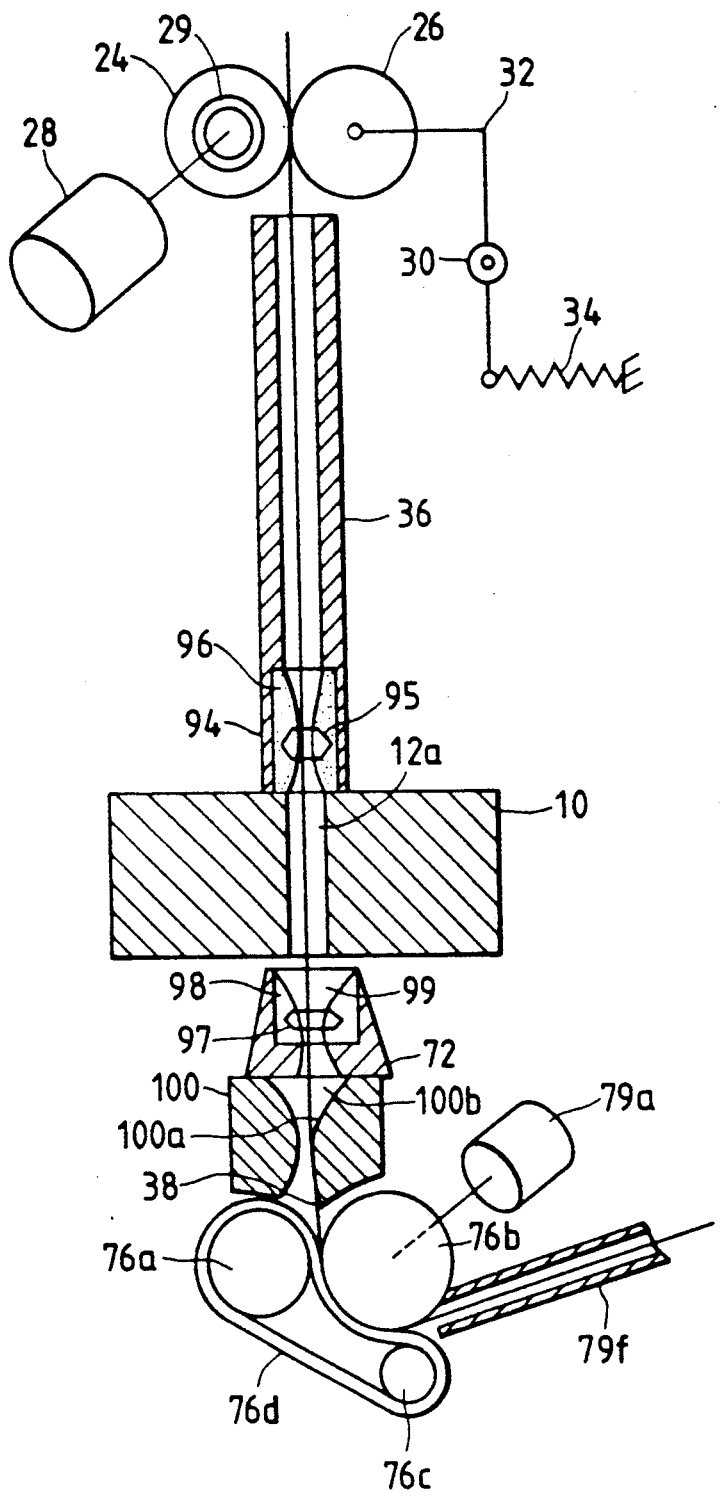
Figure 4:
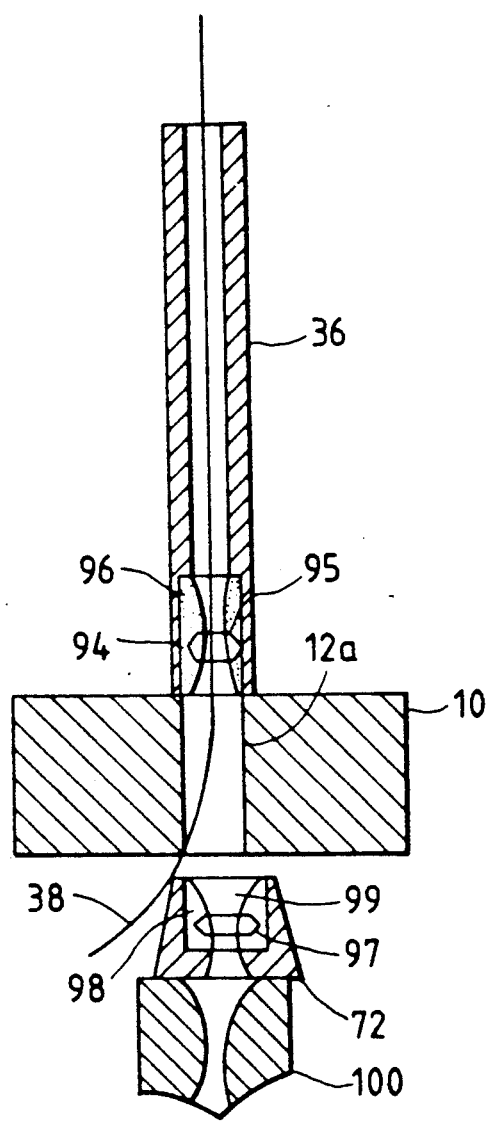
Figure 5:
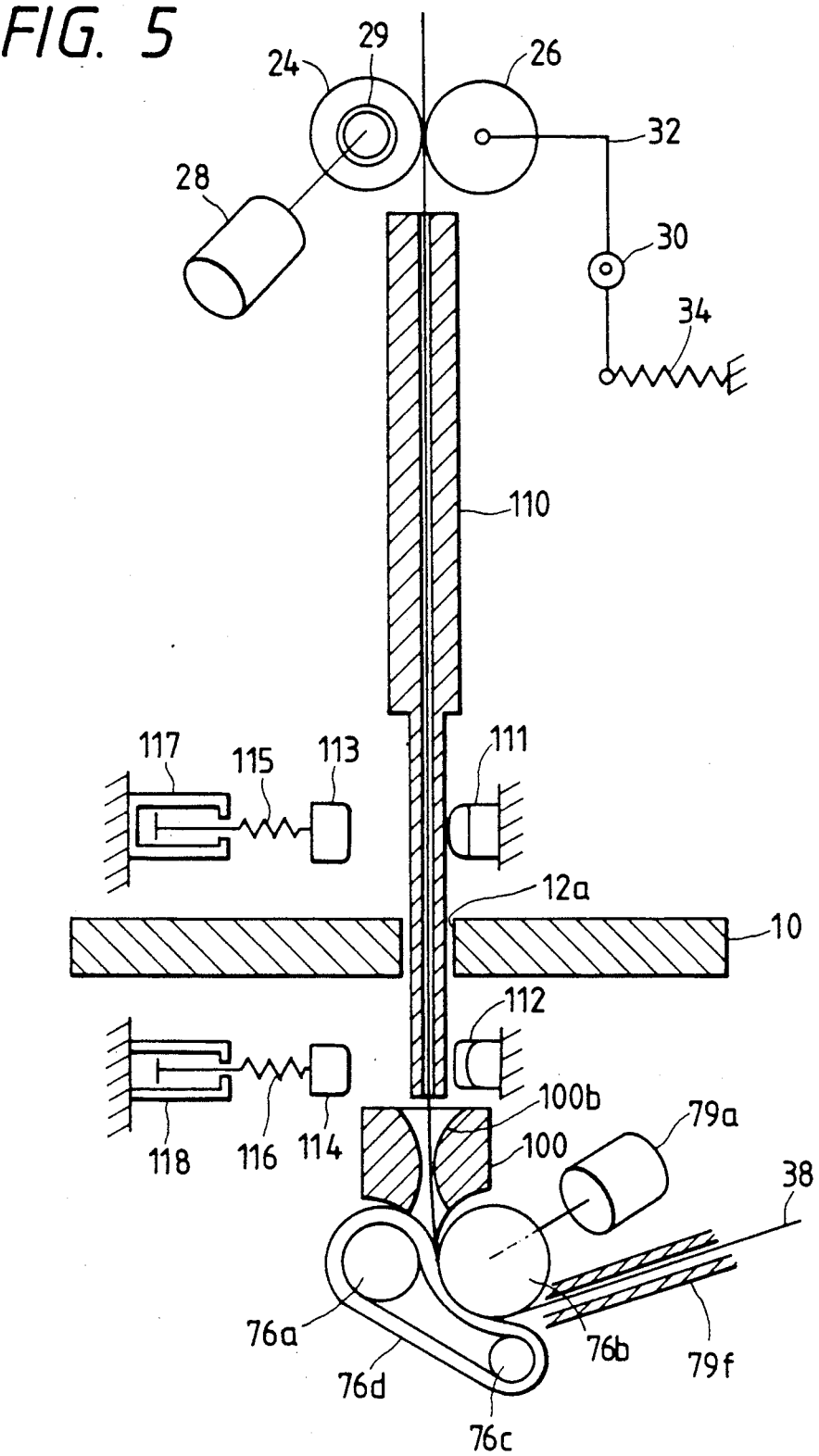
FIG. 5 is an explanatory diagram showing and embodiment of a wire electrode supplying device for use in a wire cut electric discharge machining apparatus according to the present invention.

An embodiment of the present invention will be described with reference to FIG. 5, in which components corresponding functionally to those which have been already described with reference to FIG. 3 (showing the conventional wire electrode supplying device) are therefore designated by the same reference numerals or characters. FIG. 5 is an explanatory diagram outlining the embodiment of the invention, a wire electrode supplying device in a wire cut electric discharge machine.

In FIG. 5, reference numeral 110 designates a pipe guide; 111 and 112, upper and lower V-guides, respectively; 113 and 114, upper and lower movable wire electrode retainers, respectively; 115 and 116, compression springs for pushing the wire electrode 38 against the V-guides 111 and 112 through the wire electrode retainers 113 and 114, respectively; and 117 and 118, air cylinders for moving the wire electrode retainers 113 and 114 forwardly or backwardly, respectively.

FIG. 6A is a sectional view showing the pipe guide 110 in detail. As shown in FIG. 6A, the pipe guide 110 has a hole d in which the wire electrode 38 is inserted, and it has two different outside diameters $D_1$ and $D_2$. The diameter $D_1$ is larger than the diameter $D_2$. The pipe guide 110 is installed in such a manner that its one portion having the diameter $D_2$ is closer to the workpiece 10 than the other portion having the diameter $D_1$. This is to increase the rigidity of the pipe guide, and to insert the one portion into a machining start hole small in diameter. The length $L_2$ of the one portion having the diameter $D_2$ is so determined that, when the pipe guide 110 is moved vertically, only the outer wall of the one portion having the diameter $D_2$ is in contact with the V-guides 111 and 112. Therefore, the pipe guide 110 and the V-guides 111 and 112 will not interfere with each other.

The automatic wire electrode supplying operation of the wire electrode supplying device thus constructed will be described with reference to FIG. 5.

In automatically supplying the wire electrode to the machining start hole 12a, the output shafts of the air cylinders 117 and 118 are retracted to leave the movable wire electrode retainers 113 and 114 from the V-guides 111 and 112, respectively, to allow the movement of the pipe guide 110.

Under this condition, the drive motor 20 is operated, to move the slider 16 and the pipe guide 110 secured thereto downwardly until the pipe guide passes through the machining start hole 12a of the workpiece 10 to confront the tapered wire introducing section 100b of the electric feeder 100. Then, the wire electrode feeding motor 28 is rotated to drive the wire electrode feeding pulley 24, so that the end portion of the wire electrode 38 is allowed to reach the winding mechanism 74 while being guided by the electric feeder 100. When the end portion of the wire electrode 38 reaches the rollers 79d and 79e by means of the winding mechanism 74, the detector 92 is activated. As a result, the roller mechanism 22 and the winding mechanism 74 are stopped, while the drive motor 20 is operated to lift the slider 16 until the pie guide 110 comes to the predetermined position. Under this condition, the output shafts of the air cylinders 117 and 118 are moved towards the V-guides 111 and 112 so that the wire electrode 38 is pushed against the upper and lower V-guides 111 and 112 through the movable wire electrode stainers 113 and 114. Thus, the electric discharge machining operation can be started.

As was described before, the one portion of the pipe guide 110 is $D_2$ in diameter as shown in FIG. 6A, and it is inserted into the machining start hole in the workpiece 10. If the outside diameter $D_2$ is decreased, then the machining start hole 12a, into which the pipe guide 110 is inserted, can be decreased accordingly. In this connection, a wire electrode guide pipe having an outside diameter $D_2$ of 1 mm or more can be readily manufactured. Therefore, the wire electrode can be automatically fed for all the machining start holes which are 1 mm or larger in diameter.

In the above-described embodiment, the pipe guide 110 has two different outside diameters $D_1$ and $D_2$. However, the pipe guide may be so modified that it has three or more different outside diameters increasing stepwise as shown in FIG. 6B, and its one end portion to be inserted into the machining start hole is smaller.

The outside diameters $D_1$ and $D_2$, the lengths $L_1$ and $L_2$ of the portions having the outside diameters $D_1$ and $D_2$, and the diameter d of the axial hole may be changed according to the diameter of a machining start hole 12a, the diameter of a wire electrode 38 to be used, and the thickness of a workpiece to be machined.

As was described above, according to the invention, the outside diameter of the pipe guide, which is inserted into the machining start hole in the workpiece with the wire electrode inserted therein, is changed stepwise, and its one end portion minimum in outside diameter is inserted in the machining start hole. Therefore, in machining a workpiece having a machining start hole small in diameter, the feeding of the wire electrode can be automatically, stably and accurately achieved. Thus, the wire cut electric discharge machine can be completely automatically operated according to the invention.

What is claimed is:

1. A wire electrode supplying device for use in a wire cut electric discharge machining apparatus having a stationary portion provided with V-guides, comprising: a wire electrode feeding mechanism; a pipe guide into which a wire electrode is inserted so as to be guided therealong toward a machining start hole formed in a workpiece to be machined; a lifting mechanism for reciprocating said pipe guide up and down; an electric feeder for supplying a machining electric current to said wire electrode; and a winding mechanism for winding and removing said wire electrode supplied through said electric feeder, wherein said pipe guide is shaped to have a plurality of outside diameters increasing stepwise, wherein an outside diameter of one end portion of said pipe guide which is minimum in outside diameter is smaller than an outer diameter of said machining start hole so that said one end portion of said pipe guide is inserted into said machining start hole in said workpiece by said lifting mechanism before said wire electrode is fed to said winding mechanism, said pipe guide and said V-guides not interfering with each other.

2. The wire electrode supplying device as claimed in claim 1 wherein said pipe guide is shaped to have two steps.

3. The wire electrode supplying device as claimed in claim 1 wherein said pipe guide is shaped to have three steps.

* * * * *